(12) United States Patent
Zarnowski et al.

(10) Patent No.: US 7,616,877 B2
(45) Date of Patent: Nov. 10, 2009

(54) METHOD AND APPARATUS FOR CONTROLLING A LENS, AND CAMERA MODULE INCORPORATING SAME

(75) Inventors: Terry Lee Zarnowski, Homer, NY (US); Jeffrey J. Zarnowski, Homer, NY (US); Iain A. Neil, Calabasas, CA (US)

(73) Assignee: Panavision Imaging, LLC, Homer, NY (US)

( * ) Notice: Subject to any disclaimer, the term of this patent is extended or adjusted under 35 U.S.C. 154(b) by 328 days.

(21) Appl. No.: 11/210,022

(22) Filed: Aug. 22, 2005

(65) Prior Publication Data

US 2006/0045504 A1   Mar. 2, 2006

Related U.S. Application Data

(60) Provisional application No. 60/604,525, filed on Aug. 25, 2004.

(51) Int. Cl.
| G03B 17/02 | (2006.01) |
| H04N 5/262 | (2006.01) |
| H04N 3/14 | (2006.01) |
| H04N 5/335 | (2006.01) |
| G02B 13/08 | (2006.01) |
| G02B 15/14 | (2006.01) |
| G02B 7/02 | (2006.01) |

(52) U.S. Cl. .................. 396/85; 396/79; 396/535; 348/240.3; 348/294; 348/340; 348/345; 359/668; 359/676; 359/824

(58) Field of Classification Search .............. 396/79, 396/72, 529, 535, 85; 348/231.9, 240.99, 348/240.1, 240.2, 240.3, 222.1, 249, 250, 348/272, 294, 340, 345, 375; 250/226, 472.1, 250/482.1; 359/668, 675, 676, 819, 823, 359/824
See application file for complete search history.

(56) References Cited

U.S. PATENT DOCUMENTS 4,407,567 A    10/1983   Michelet et al.

(Continued)

FOREIGN PATENT DOCUMENTS

| JP | 4-326264 | 11/1992 |
| JP | 6-178178 | 6/1994 |
| JP | 9-166493 | 6/1997 |

(Continued)

OTHER PUBLICATIONS

Preliminary Product Brief for "CoderCam TC7730 2 Megapixel Camera Module With Fully Programmable ISP and Motion JPEG Compression", TransChip, 2005.
Notice of Reasons for Refusal for Japanese Patent Application No. 2007-530099, mailed Oct. 7, 2008 (5 pages).
International Search Report mailed Sep. 19, 2006, for PCT Application No. PCT/US05/30159, filed Aug. 22, 2005, two pages.

*Primary Examiner*—Rochelle-Ann J Blackman
(74) *Attorney, Agent, or Firm*—Morrison & Foerster LLP

(57) ABSTRACT

An efficient image capture system is disclosed that integrates functions to control a lens including one or more of focus or object distance, zoom, temperature compensation, and stabilization within an image signal processor (ISP) with appropriate algorithms. In particular, the integrated ISP circuitry may control the motion of the focus and zoom optics of an optical assembly, control stabilization, control the flash, provide enhanced functions and features for controlling the zoom and focus lenses to enable enhanced image capture sequences and/or tracking lens data, provide a set of algorithms within the ISP to alter the aspect ratio (both height and width of an image) of the image, for example to compensate for the addition of an anamorphic lens, and integrate an anamorphic lens into the module to alter an image's projected aspect ratio onto the focal plane array.

33 Claims, 2 Drawing Sheets

U.S. PATENT DOCUMENTS

| | | | |
|---|---|---|---|
| 4,816,860 A | 3/1989 | Iida et al. | |
| 4,972,267 A | 11/1990 | Kaneko et al. | |
| 5,282,042 A | 1/1994 | Yoshida et al. | |
| 5,895,129 A | 4/1999 | Ohta et al. | |
| 6,009,340 A | 12/1999 | Hsia | |
| 6,084,229 A | 7/2000 | Pace et al. | |
| 6,169,853 B1 | 1/2001 | Hasushita et al. | |
| 6,407,439 B1 | 6/2002 | Hier et al. | |
| 6,642,955 B1 | 11/2003 | Midgley et al. | |
| 6,762,888 B1 | 7/2004 | Oshima | |
| 6,853,808 B1* | 2/2005 | Yasuda et al. | 396/72 |
| 7,212,358 B2* | 5/2007 | Mattsson et al. | 359/824 |
| 7,329,856 B2* | 2/2008 | Ma et al. | 250/226 |
| 2002/0003576 A1 | 1/2002 | Konishi et al. | |
| 2002/0012539 A1* | 1/2002 | Sato et al. | 396/529 |
| 2003/0223010 A1 | 12/2003 | Kaplinsky et al. | |
| 2004/0109236 A1* | 6/2004 | Nishioka | 359/643 |
| 2004/0204055 A1 | 10/2004 | Nousiainen | |

FOREIGN PATENT DOCUMENTS

| | | |
|---|---|---|
| JP | 10-326906 | 12/1998 |
| JP | 11-312797 | 11/1999 |
| JP | 2003-107310 | 4/2003 |
| JP | 2003-134364 A | 5/2003 |
| JP | 2003-262907 A | 9/2003 |
| WO | WO-2004/010199 A2 | 1/2004 |
| WO | WO-2004/010199 A3 | 1/2004 |
| WO | WO-2006/026317 A2 | 3/2006 |
| WO | WO-2006/026317 A3 | 3/2006 |

* cited by examiner

METHOD AND APPARATUS FOR CONTROLLING A LENS, AND CAMERA MODULE INCORPORATING SAME

CROSS-REFERENCE TO RELATED APPLICATIONS

This application claims the benefit under 35 U.S.C. §119(e) of U.S. Provisional Application No. 60/604,525, filed on Aug. 25, 2004, the contents of which are incorporated by reference herein.

FIELD OF THE INVENTION

The present invention relates, generally, to an image capture system, and in particular embodiments, to an image capture system that integrates functions within a lens module, including some of all of the following: lens groups, lens motor drives, focal plane array, Image Signal Processor (ISP), control of focus or object distance, zoom, flash, shutter, temperature compensation, and/or stabilization.

BACKGROUND OF THE INVENTION

Conventional imaging systems (e.g. digital cameras, camera phones, camcorders and other imaging devices and applications) typically incorporate a camera lens module as part of the system assembly. This lens module is comprised of a focal plane array, a mechanical housing, an optics assembly, and an electrical interface with connector.

FIG. 1 illustrates an exemplary conventional motor driven lens module 100 (module case represented by dashed line). The lens groups (focus lens group 102 and zoom lens group 104) within the lens module 100 are illustrative only, as it should be understood that many different configurations of lenses may be used within the lens module 100. For example, if the lens is a fixed or prime lens, then only one or more focus lens groups are present and move for focusing. If the lens is a zoom lens, then the lens groups act together to provide the zooming function, and one or more focus lens groups move for focusing. Additionally, one or more lens groups may be moved for temperature compensation, image stabilization, and anamorphic distortion.

A lens group is comprised of one or more lens elements with a primary purpose of altering the path of electromagnetic radiation. Elements of a lens can be made from many differing types and compositions of materials, examples of which include glass of various compositions, crystals, plastics or resins, ceramics, liquids, or even a combination. Additionally, lens elements can be reflective, such as a mirror or prism. The elements of a lens can be made into different shapes, thicknesses, or other properties and can be made and/or combined with other elements to perform various tasks including focusing, magnification, reduction, reflection, refraction, correction or creation of regular distortion (including anamorphic distortion) and correction of lateral color. By altering the position, shape, transmittance, reflectance, magnetic attraction, or other properties of the elements, the functions described above may be performed. For example, moving an element along an axis perpendicular to the focal plane array 108 (along the primary or optical axis) is useful to provide focus and/or zoom capability. Similarly, changing the shape of a liquid or pliable element and/or in combination with moving it can do the same. Moving or changing the shape of an element relative to and along the primary axis is useful to provide image stabilization and temperature compensation. Sensors may be employed to sense some property of the lens elements such as position, shape, temperature, magnetic flux, displacement, humidity, and light. Some example embodiments of lens sensors include linear or rotary encoders, displacement sensors, thermistors, thermocouples, counters, motion detectors, and accelerometers.

The lens groups of FIG. 1 focus the visible electromagnetic spectrum or the infrared electromagnetic spectrum onto an image sensor (e.g. focal plane array) 108 within the lens module 100. A focal plane array is a device containing one or more elements that detect or sense electromagnetic radiation at various wavelengths or in ranges of wavelengths. These elements can be tuned through a variety of means to sense or detect, for example, the human visible light spectrum as would be used in digital photography and video. They can also be tuned to sense or detect infrared light, ultraviolet light, or other desired wavelengths or bands of wavelengths. Some example embodiments of focal plane arrays include charge coupled devices (CCDs), Complementary Metal Oxide Semiconductor (CMOS) active pixel sensors, CMOS active column sensors, quantum dot focal plane arrays, and gallium arsenide infrared arrays. Examples of focal plane arrays are found in U.S. Pat. No. 6,084,229, U.S. Pat. No. 5,471,515, and U.S. Pat. No. 4,054,797, the contents of which are incorporated by reference herein.

In FIG. 1, raw image data 106 captured on the focal plane array 108 is transferred to an ISP 110. The ISP 110 is used to convert the raw image data 106 into usable still or video images that can be stored, printed, displayed, or further analyzed. The ISP 110 runs various algorithms for this purpose. As an example, the ISP 110 may run one or more algorithms to perform various image processing tasks including, but not limited to: automatic dark reference, color filter de-mosaicing, white balance, color correction, color space conversion, and compression. The ISP 110 can be implemented by algorithms running on a standalone processor such as a Digital Signal Processor (DSP), algorithms running in a programmable semiconductor device such as Field Programmable Gate Array (FPGA), algorithms integrated directly into logic such as an Application Specific Integrated Circuit (ASIC), a combination of the aforementioned or other embodiments. Examples of ISPs are Faraday Technology Corporation's FTISP100S 2-Megal Pixel ISP, and Mtekvision's MV9313 ISP.

Processed image data 112 from the ISP 110 is then transferred to a system processor 114. The system processor 114 accepts user input 116 to control the zoom lens group and focus lens group, shown symbolically as two switches for zoom control, although it should be understood that a number of different user inputs may be delivered to the system processor 114 using a number of different input mechanisms to control different functions. The system processor 114 then generates control signals 118, shown symbolically as a focus control signal and a zoom control signal, although it should be understood that a number of different control signals may be generated by the system processor 114. These control signals are then sent to lens drive electronics 120, which control focus and zoom lens motor drives 122 within the lens module 100.

The focus and zoom lens motor drives 122 convert electrical energy to mechanical motion to move the zoom lens group 104 and the focus lens group 102, and may also control other functions of the lens module 100. For example, a motor drive can provide force to alter the position, shape, or location of other components within the image capture system. In another example, a motor drive can be used to change the shape and/or position of a liquid or pliable lens, change the physical position of a lens element, open or close a shutter (e.g. mechanically via an iris or optically via a transmissionvariable Liquid Crystal Display (LCD)), or provide energy to an illumination source. Example embodiments include step motors, servo motors, screws, magnetic repulsion and attraction, piezoelectric, ultrasonic, flash, and the like. A motor drive can also comprise a knob, lever, gear, wheel, or other mechanical device or a combination of mechanical devices that can be moved manually or moved in combination with other motor drives. An example embodiment is a rotary knob that can alter the position of one or more lens elements to provide a focusing function. Motor drives can be made of multiple components, some of which can accept control signals from an ISP or other device that in turn translates these signals into the appropriate energy needed to provide the force to alter a property of an element. A simple example of a motor drive made of multiple components is a step motor driven screw. The screw drives a nut that is connected to the element of interest; when the screw turns, the position of the element changes. A motor such as a stepper is used to turn the screw. The motor requires energy to turn which is provided by a translator. The translator interprets control signals from the ISP or other source and converts these to electrical pulses of the correct relationship to turn the stepper motor. Another example is a liquid lens drive. The liquid lens has magnetic properties such that when one or more external magnetic fields are applied, the lens can change shape and/or position. The drive in this case can be a permanent magnet and/or a coil of wire. When the magnet is moved or the coil of wire is energized in varying ways, the changing magnetic field changes the properties of the liquid lens. A translator converts controls signals from an ISP or other device and converts these signals into the appropriate energy. An example of a liquid lens element is found in U.S. Pat. No. 6,369,954, the contents of which are incorporated by reference herein.

Because recent advances in focal plane array technology have enabled focal plane arrays to contain more circuitry and perform more functions, some conventional lens modules now incorporate the ISP 110 on the same integrated circuit chip that contains a focal plane array 108 such as a CMOS active column sensor. More advanced conventional lens modules 100 may also incorporate the processing of focus control on the same integrated circuit chip that contains the focal plane array 108.

However, as FIG. 1 illustrates, the electrical control signals 118 that control the zoom lens drives, the flash, the shutter and other functions though the lens drive electronics 120 (which convert electrical energy to mechanical motion to move the lens and control other functions) have conventionally been derived outside of the lens module 100. For example, an auto-focus control signal from a position measurement sensor (e.g. an infrared or ultrasonic sensor) may be derived in a discrete ISP 110 and sent to a focus drive within the lens drive electronics 120. For image-based focus control, the image data 106 must be transferred from the lens module 100 to the system processor 114 where an edge-detection auto-focus algorithm is used to develop the focus control signal. Additionally, the user may wish to manually alter the object distance by controlling the focus lens group 102. Signals from buttons, switches or other input devices must be input to the system processor 114 which in turn sends the appropriate focus control signals to the lens drive electronics 120. Control signals for the zoom lens group, flash, shutter and other functions are similarly generated outside of the lens module 100, as described above. An example of a conventional system with control signals developed outside the lens module is Published U.K. Patent Application No. GB 2,141,260 A.

Because conventional imaging systems utilize a lens module 100 separate from the devices that generate control signals, such as the lens drive electronics 120 illustrated in FIG. 1, additional manufacturing steps are required to assemble and connect the lens module together with these associated devices, increasing the time and expense of manufacture. In addition, these extra steps increase the chance of assembly errors.

Having lens modules separate from devices that generate control signals, such as the lens drive electronics, can also create performance issues. The generation of the control signals outside the module wastes system power because of the extra processing steps performed by the devices outside the module. In addition, as described above, imaging systems that have integrated auto-focus lens control utilize an algorithm for controlling the focus lens that is located on the ISP separate from the focal plane array. The image processor must read the image data from the focal plane array, process the data, and then transmit control signals to the drive electronics of the focus lens, increasing the image acquisition time.

Having lens modules separate from devices that generate control signals, such as the lens drive electronics, can also lead to undesirable product specifications and operational parameters. For example, the use of separate circuits (e.g. chips) for the lens drive electronics adds extra components, which can lead to increased imaging device size and weight. In addition, the use of separate circuits may require that each circuit be separately powered, with higher-powered output buffers used to drive signals between chips, resulting in increased power consumption.

In today's competitive consumer electronics environment in which the clear trends are increased features, decreased product size, and lower power consumption, manufacturers of imaging devices such as digital cameras and cell phones must utilize technologies which produce the most performance and capability in the smallest packaging possible, while at the same time minimizing assembly costs and the number of assembly errors.

With regard to capability, manufacturers would greatly benefit from a lens module with increased integrated functionality. An integrated modular approach would also allow imaging device manufacturers to make a standardized "platform" that can accommodate plug-in modules with different features to produce different product models.

With regard to performance, the size and power consumption improvements that can be realized using a lens module with increased integrated functionality would also be beneficial to imaging device manufacturers. Furthermore, compact compound zoom lens technology may be employed within these integrated modules, giving manufacturers a high-performance, wide-angle zoom lens not previously available in small imaging devices. Compact compound zoom lens technology is described in U.S. patent application Ser. No. 11/101,933, the contents of which are incorporated by reference herein.

With regard to minimizing assembly costs and assembly errors, manufacturers would greatly benefit from modularized multi-function components that enable devices to be assembled and connected with relatively few manufacturing steps, instead of having to assemble and connect multiple small devices.

Therefore, there is a need to integrate functions within a lens module, including some or all of the following: lens groups, lens motor drives, focal plane array, ISP, control of focus or object distance, zoom, flash, shutter, temperature compensation, and/or stabilization.

SUMMARY OF THE INVENTION

Embodiments of the present invention are directed to a modular image capture system that improves manufacturability (i.e. reduces manufacturing time, expense, and number of assembly errors) by integrating functions within a lens module, including some or all of the following: auto-focus and zoom lens groups, lens motor drives, focal plane array, ISP, control of zooming and focus or object distance, flash, shutter, temperature compensation, image stabilization, and a distance/focus measurement device (for non-image based focus control), including the appropriate algorithms. The integration of functions also improves image acquisition time and decreases imaging device size, weight, and power consumption.

One exemplary image capture system according to embodiments of the present invention may be formed with a focal plane array, a compound zoom lens, an ISP, an electrical and/or mechanical interface which are integrated into a single lens module assembly or chassis, and a housing that can provide a support structure for the assembly and other components in the image capture system. An electrical interface connected to the lens module chassis is used to communicate with a host device, and a mechanical interface is used to incorporate the assembly with the host device.

In particular, many of the functions and algorithms described above, such as the circuitry that generates the focus and zoom lens drive control signals, may be incorporated and executed on the same integrated circuit that performs the ISP function. This enhanced ISP can either be integrated directly on-chip with the focal plane array, or can be implemented in a discrete semiconductor integrated circuit mounted somewhere within the lens module.

An optional anamorphic lens, stabilization sensors and a stabilization drive may also be employed in the lens module. The stabilization sensors generate outputs which are fed back to and processed in the ISP, where the ISP can execute integrated image stabilization algorithms and send control signals back to the stabilization drive, all within the confines of the lens module, to stabilize the image being captured. Alternatively or in addition to the above, the ISP can move the image data to provide stabilization. Additionally, regardless of how the image is projected onto the focal plane array or otherwise captured by the system, an algorithm can be added to the ISP to alter the image aspect ratio as captured by the focal plane array, for example, to de-anamorphose the final image.

Flash or illumination control can also be integrated into the module, as well as the control of a shutter.

Alternative embodiments of the present invention of an image capture system according to embodiments of the present invention may include multiple ISPs, focal plane arrays, lenses and lens groups, and/or varying types of electrical and/or mechanical interfaces. Other alternative embodiments may include the addition of improved lenses or lens groups, one or more motor drives, one or more sensors, and/or one or more improved ISPs enhanced to control the motor drives and/or interface to the sensors.

The integrated approach provides certain benefits, as mentioned above. For example, the shot-to-shot time can be decreased by integrating the ISP and the focus control algorithm together on the same chip. Integrating the drive electronics, feedback devices, control signals, and other relevant lens control electronics as well as the flash within the module assembly reduces the amount of electrical interconnects to the module from the system and can reduce overall system size and power consumption.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention are directed to a modular image capture system that improves manufacturability (i.e. reduces manufacturing time, expense, and number of assembly errors) by integrating functions within a lens module, including some or all of the following: lens groups, lens motor drives, focal plane array, ISP, control of focus (including regular focus, close focus, or macro focus) or object distance, zoom, flash, shutter, temperature compensation, and/or stabilization, including the appropriate algorithms. The integration of functions also improves image acquisition time and decreases imaging device size, weight, and power consumption. In particular, many of the functions and algorithms described above may be incorporated and executed on the same integrated circuit that performs the ISP function. This enhanced ISP can then be integrated on the same substrate as the focal plane array or the ISP can be produced on a separate substrate. This separate substrate can also be integrated within the module.

One exemplary image capture system according to embodiments of the present invention may be formed with a focal plane array, a compound zoom lens, an ISP, an electrical and/or mechanical interface which are integrated into a single assembly, and a housing that can provide a support structure for the assembly. An electrical interface is used to communicate with a host device, and a mechanical interface is used to incorporate the assembly with the host device. The electrical interface may include one or more electrical connectors such as a plug or socket, and the mechanical interface may include guides, rails, bosses, and the like to accurately locate the module or assembly into the host device. The mechanical interface may also be integrated with the electrical interface to form a single electromechanical connector. Example host devices include, but are not limited to, a digital still camera, a video camera, a mobile phone, a personal data assistant, a security or surveillance camera, and an industrial camera.

Figure 2:
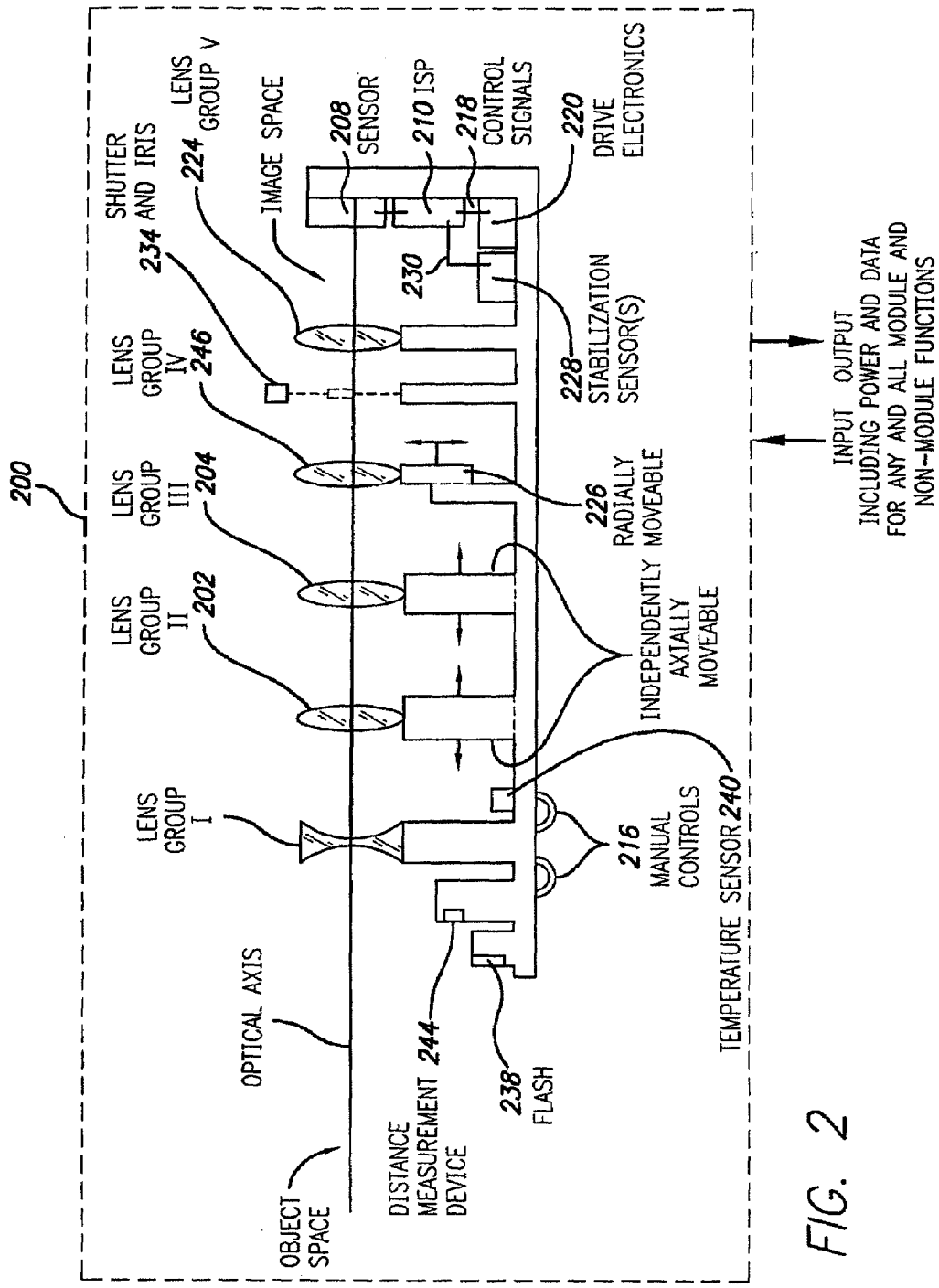
FIG. 2 illustrates an exemplary motor driven lens module (module case represented by dashed line) with integrated functionality according to embodiments of the present invention.

FIG. 2 illustrates an exemplary motor driven lens module 200 (module case represented by dashed line) with integrated functionality according to embodiments of the present invention. The zoom, focus and thermal compensation lens groups 202 and 204 within the lens module 200 are illustrative only, as it should be understood that many different configurations of lenses may be used within the lens module 200. One or more of the lens groups may also be rotatable, as described in U.S. patent application Ser. No. 11/101,933. FIGS. 34 and 38 of that application illustrate an exemplary rotatable lens system including a liquid lens suitable for use in the lens module of the present invention.

As mentioned above, U.S. patent application Ser. No. 11/101,933 describes a high-performance, compact compound zoom technology that may be used within the lens module 200 of the present invention. The compound zoom technology described in that application is a wide-range, ultra-wide angle optionally rotatable compound zoom lens system with a simplified zooming structure that reduces the number of independently moving lens groups to just two or three. Compound zoom technology allows for a very small diameter front element even with a large zoom range and extremely wide field of view. In order to allow the system to be used in a compact package, one or more fold prisms or mirrors can be included in the design. The reflective nature of these prisms or mirrors provides an additional benefit of preventing Electromagnetic Interference (EMI) from escaping the lens module. The optical design consists of a zooming kernel followed by a zooming relay, with a stationary P lens group in between. The zooming kernel has either an NP or NPP structure, and the zooming relay has either a P or PP structure. The kernel, as defined herein, includes all lens groups on the object space side of the stationary P lens group, while the zooming relay includes all zoom groups on the image space side of the stationary P lens group. There are just two or three independently moving groups altogether, one or two on each side of an intermediate image. The front group is stationary with respect to the image plane, as are the fold prisms. The zooming relay, comprising just one or two independently moving positive groups, has a notably simple structure that contributes significantly to the simplicity of the lens design. The compound zoom technology can also utilize the zooming groups as focusing groups and for temperature compensation, thus maintaining a relatively simple mechanical structure. The compactness and performance of compound zoom technology, not previously available, makes it ideally suited for inclusion in the integrated lens module 200 of FIG. 2.

Figure 1:
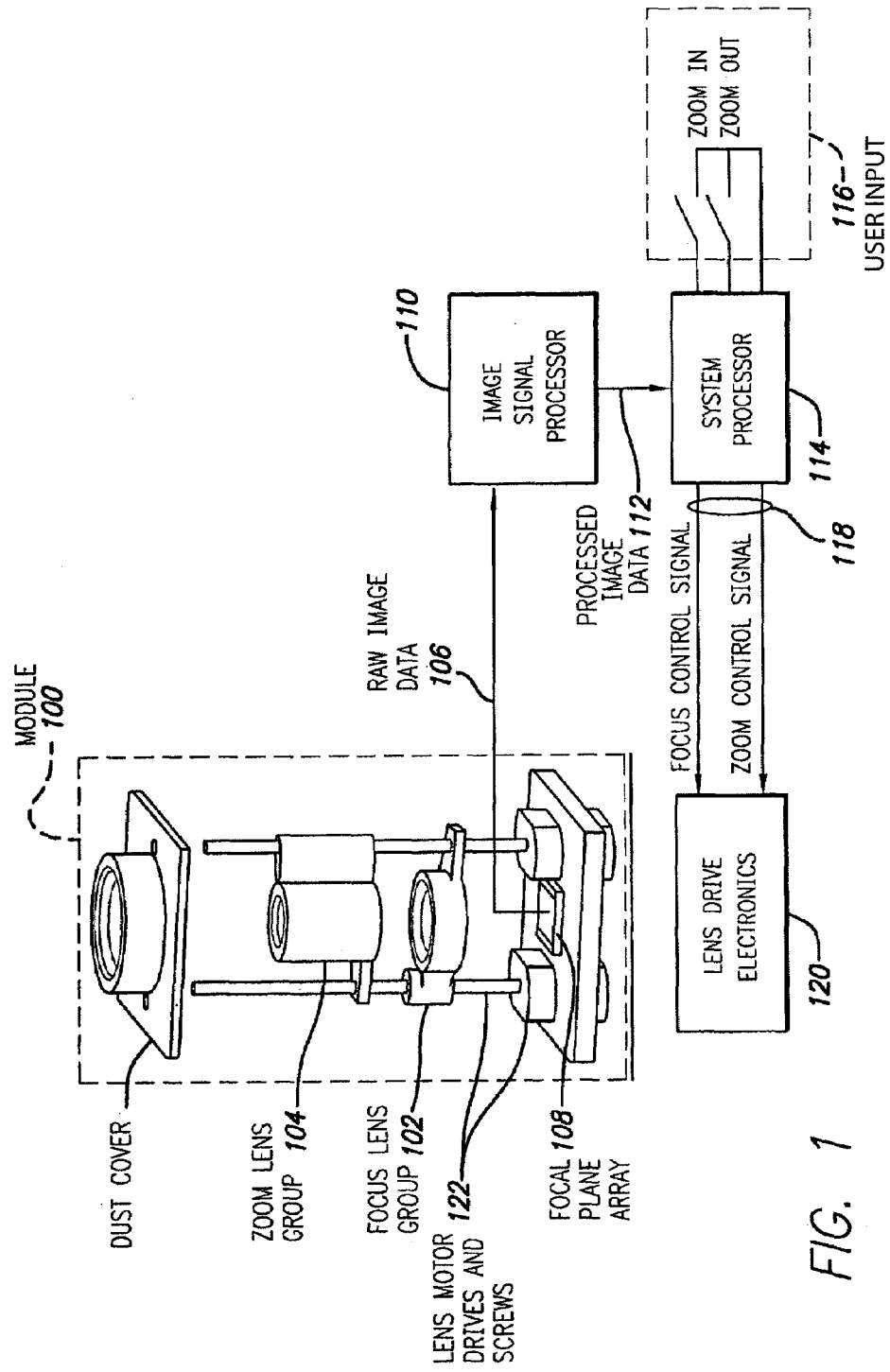
FIG. 1 illustrates an exemplary conventional motor driven lens module (module case represented by dashed line).

In FIG. 2, raw image data captured through the various lens groups is transferred from an image sensor (e.g. a focal plane array) 208 to an Image Signal Processor (ISP) 210 that may be located on the same chip or on a different chip as the image sensor, where the raw image data is processed. The focal plane array 208 may be sensitive to visible light having wavelengths of about 450-650 nanometers, ultraviolet light having wavelengths of less than about 450 nanometers, infrared light having wavelengths of greater than about 650 nanometers, or any combination of the above. The ISP 210 also accepts user input to control the zoom lens group and focus lens group, shown symbolically as two thumbwheels 216 on the lens module 200, although it should be understood that a number of different user inputs may be delivered to the ISP 210 using a number of different input mechanisms to control different functions. The ISP 210 then generates and sends control signals 218 to lens drive electronics 220, which may be located on-chip or off-chip but within the lens module 200. The lens drive electronics 220 then send further lens motor drive control signals to control focus and zoom lens motor drives and other functions within the lens module 200. Note that the focus and zoom lens groups may also be controlled manually, in addition to or instead of the lens drive electronics. In addition, the ISP 210 can derive an auto-focus control signal using focus or position measurement sensors (e.g. an infrared, ultrasonic, or additional image sensor) 244 which is sent to the lens drive electronics 220. The ISP 210 may also communicate with storage or other devices outside the module through a module connector to perform additional functions such as storing data into the storage or retrieving data from the storage. Note that in FIG. 2, unlike FIG. 1, the circuitry that generates the focus and zoom lens drive control signals 218 is integrated within the ISP 210 and located within the lens module 200. The ISP 210 can either be integrated directly on-chip with the focal plane array 208, or can be implemented in a discrete semiconductor die mounted somewhere within the lens module 200. The focus and zoom lens motor drives receive the control signals and convert electrical energy to mechanical motion to move the zoom, focus and thermal compensation lens groups 204 and 202 and control other features of the lens module 200.

Note that if one or more of the lens groups are rotated, as described above, it may be desirable to rotate the captured image by rotating the chip containing the focal plane array 208, adding a prism within or between lens groups, or by processing the raw image data in ISP 210 to perform the rotation by manipulating data.

Exemplary FIG. 2 shows an optional stabilization lens 246 and radially movable lens mount 226 located on the image side of the zoom, focus and thermal compensation lens group 204, although it should be understood that the stabilization lens and lens mount may be located elsewhere in the lens module 200. Stabilization sensors 228 are shown in FIG. 2 as being located near the focal plane array 208, although it should be understood that the stabilization sensors may be located elsewhere in the lens module 200. The stabilization sensors 228 (e.g. feedback devices such as accelerometers or gyroscopes) generate stabilization data outputs 230 which are fed back to and processed in the ISP 210, where the ISP can execute integrated image stabilization algorithms and send control signals 218 back to the drive electronics 220 to control the lens mount 226 and stabilize the image being captured. An example of a lens system with image stabilization is found in U.S. Published Application No. U.S. 2004/0021953 A1, the contents of which are incorporated herein by reference.

Focal plane arrays and optics for modules are typically designed around the standard imaging format aspect ratios such as 4:3 or 16:9. This can limit performance, viewing angle, zoom factor, cost and other parameters. The use of anamorphic lenses can eliminate the restrictions imposed by these standards. Exemplary FIG. 2 shows an optional anamorphic lens 224. The anamorphic lens 224 may be added within the lens module 200 to alter the projected image aspect ratio. Although the example of FIG. 2 shows the anamorphic lens 224 between the stabilization lens group 246 and a shutter 234, the anamorphic lens 224 can be added anywhere within the optical path. Additionally, regardless of how the image is projected onto the focal plane array or otherwise captured by the system, an algorithm can be added to the ISP 210 to alter the image aspect ratio as captured by the focal plane array 208. This introduction of an anamorphic lens 224 with or without the aspect ratio image processing algorithm enables optimization of different parameters for the system. For example, smaller diameter lenses may be used to lower costs, and/or a square aspect image sensor can be used to capture 4:3 or 16:9 aspect ratio images. An example of a cost and performance enhancement is to use an anamorphic lens to squeeze an image horizontally so that it can be completely captured by a square format focal plane array. This enables the use of less expensive and smaller diameter optics, and a smaller and therefore cheaper focal plane array. Use of an anamorphic lens 224 also enables the use of non-square pixels.

Flash or illumination control 238 for illuminating a scene can also be integrated into the module under the control of flash control signals from the drive electronics 220 and the ISP 210. In the case of LED or similar type illumination, the function of a 'flashlight' can be added as well as the normal "strobe" for digital photography or constant or pulsed illumination for video capture.

Also shown in exemplary FIG. 2 is a shutter 234, which may be opened and closed under the control of shutter control signals from the drive electronics 220 and the ISP 210.

Alternative embodiments of the present invention of an image capture system according to embodiments of the present invention may include multiple ISPs, focal plane arrays, lenses and lens groups, and/or varying types of electrical and/or mechanical interfaces. Other alternative embodiments may include the addition of improved lenses or lens groups, one or more motor drives, one or more sensors, and/or one or more improved ISPs enhanced to control the motor drives and/or interface to the sensors.

The integrated functions described above and their algorithms can respond to user input via pushbuttons, switches, or other input devices, from feedback devices such as position, acceleration, gyroscopes, and/or other sensors, and can also react to data sent to it by the system or the connector for the lens module 200. Electrical control signal outputs may be generated that interface directly to a lens drive within the lens module and/or send data out the data interface to the image capture system.

The integrated approach illustrated in FIG. 2 provides certain benefits. For example, the shot-to-shot time can be decreased by integrating the ISP 210 and the focus control algorithm together on the same chip. In the case where the focus changes as the lens is zoomed, focus following (maintaining focus as the zoom changes) can be enabled when the user alters the zoom ratio. The user can alter the zoom ratio mechanically or by activating a button, switch or other input device 216, with such activation or mechanical motion providing a signal which can be input directly via an electrical signal to the ISP algorithms or through the data interface. Integrating the drive electronics 220, feedback devices, control signals, and other relevant lens control electronics as well as the flash within the module assembly reduces the amount of electrical interconnects to the module from the system and can reduce overall system size and power consumption while at the same time improving performance.

The addition of this integrated control capability to either or both control of the zoom and focus lens groups enables other features such as the tracking and recording of lens position data with respect to the captured image, and/or enables user programmed sequences to be entered and executed such as "set zoom to X zoom" and "set object distance (focus) to Y," where X and Y are programmable variables. Even more complex zoom and focus control can be implemented with the addition of multiple settings with timed or event driven intervals (e.g. memorize and repeat a sequence). For example, a simple sequence that could be stored is (1) zoom to 3× magnification, (2) set focus to 3.0 feet, (3) capture image, (4) zoom to 2× magnification, (5) adjust focus to 12 feet, and (6) capture image.

Temperature measurement and optical as well as image compensation may also be included within the lens module 200. Temperature or thermal compensation may include a temperature sensor 240, which generates temperature data that is sent to the ISP 210 for processing. Changes in temperature can cause de-focusing which can be compensated within the optics by using focus control and moving one or more of lens groups 202 and 204. Additionally, the image data can be temperature compensated in the ISP 210 to improve image quality.

Zoom lens controls may also be integrated into the lens module 200 and may be placed in a location accessible to a user (see representative thumbwheels 216 in FIG. 2), even after the lens module is installed in the image capture system. Zoom lens controls are typically either a mechanical device or electrical switches or buttons. For the mechanical devices, a rotary knob or collar, lever, cam, gears or other device (or a combination of all or some of the aforementioned) is moved by the operator, and this motion is transmitted to the zoom lens to move it. For electrical switches or buttons, the duration of motion for the zoom lens is typically proportional to the length of time the switch or button is actuated. When the switch or button is pushed, electrical signals are typically sent to the imaging system controller, which then sends corresponding electrical signals to the zoom lens electric drive system. The drive system is typically a motor which takes the electrical signal and converts it back to mechanical motion either directly or through a mechanical device to move the zoom lens.

Note that when the zoom lens is moved, the image may go out of focus during zooming, requiring the image to be re-focused. Focus lens controls may also be integrated into the module in a location accessible to a user, to enable the user to perform this re-focusing. Additionally, the focus group can be changed by the user to alter the object distance or the focus lens group(s) may be controlled by the ISP to maintain the focus automatically.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A lens module with integrated functionality, comprising:
a plurality of lens groups for receiving an image and providing a zooming capability;
an anamorphic lens to modify the image aspect ratio;
a focal plane array aligned with the lens groups for capturing the image through the lens groups and generating raw image data;
an Image Signal Processor (ISP) co-located with the focal plane array on a single integrated circuit for receiving and processing the raw image data and generating control signals, the control signals including a zoom control signal, the ISP programmed for performing an anamorphic image processing algorithm to de-anamorphose the image;
drive electronics communicatively coupled to the ISP for receiving the control signals and generating lens motor drive signals;
one or more lens motor drives communicatively coupled to the drive electronics for receiving the lens motor drive signals, and coupled to the lens groups for moving the lens groups in accordance with the lens motor drive signals; and
a lens module chassis for supporting the lens groups, the focal plane array, the ISP, the drive electronics, and the one or more lens motor drives, the lens module chassis for enabling the lens module to be assembled into an imaging system as a single component.

2. The lens module as recited in claim 1, the lens groups comprising a compound zoom lens system.

3. The lens module as recited in claim 1, wherein at least one of the lens groups is a focus lens group, the ISP is for further generating focus control signals, and the one or more lens motor drives includes a focus lens motor drive.

4. The lens module as recited in claim 3, further including a focus sensor communicatively coupled to the ISP for assisting the ISP in generating the focus control signals.

5. The lens module as recited in claim 1, further comprising:
one or more stabilization sensors communicatively coupled to the ISP for generating and sending stabilization data to the ISP; and
a stabilization drive coupled to one or more of the lens groups and to the ISP for receiving stabilization control signals generated by the ISP and for performing image stabilization;
wherein the ISP is configured for processing the stabilization data and generating the stabilization control signals.

6. The lens module as recited in claim 1, further comprising:
one or more temperature sensors communicatively coupled to the ISP for generating and sending temperature data to the ISP;
wherein the ISP is configured for processing the temperature data and generating focus control signals for temperature compensation.

7. The lens module as recited in claim 1, further comprising:
a flash driver communicatively coupled to the drive electronics and the ISP for controlling a flash;
wherein the ISP is configured for generating flash control signals for the flash driver.

8. The lens module as recited in claim 1, further comprising:
a shutter communicatively coupled to the drive electronics and the ISP for controlling the image captured on the focal plane array;
wherein the ISP is configured for generating shutter control signals for the shutter.

9. The lens module as recited in claim 1, wherein the focal plane array is a Charge Coupled Device (CCD).

10. The lens module as recited in claim 1, wherein the focal plane array is a Complementary Metal Oxide Semiconductor (CMOS) active pixel sensor.

11. The lens module as recited in claim 1, wherein the focal plane array is a Complementary Metal Oxide Semiconductor (CMOS) active column sensor.

12. The lens module as recited in claim 1, wherein the focal plane array is a quantum dot focal plane array.

13. The lens module as recited in claim 1, wherein the focal plane array is sensitive to a visible spectrum of wavelengths of about 450-650 nanometers.

14. The lens module as recited in claim 1, wherein the focal plane array is sensitive to an infrared spectrum of wavelengths of greater than about 650 nanometers.

15. The lens module as recited in claim 1, wherein the focal plane array is sensitive to an ultraviolet spectrum of wavelengths of less than about 450 nanometers.

16. The lens module as recited in claim 1, wherein the focal plane array is sensitive to one or more of a visible spectrum of wavelengths of about 450-650 nanometers, an infrared spectrum of wavelengths of greater than about 650 nanometers, and an ultraviolet spectrum of wavelengths of less than about 450 nanometers.

17. The lens module as recited in claim 1, wherein the at least one of the lens groups comprises a liquid lens.

18. The lens module as recited in claim 1, the ISP for communicating with external storage to store or retrieve image or image-related data.

19. The lens module as recited in claim 1, the ISP for storing lens position data with respect to a captured image.

20. The lens module as recited in claim 1, the ISP for storing sequences of lens position data for subsequent execution.

21. The lens module as recited in claim 1, further comprising:
one or more connectors to connect the lens module to a host device, the one or more connectors including one or more of an electrical interface for transferring data to and from the lens module, and a mechanical interface for accurately locating the lens module into the host device.

22. The lens module as recited in claim 21, wherein the mechanical interface is integrated with the electrical interface to form a single electro-mechanical connector.

23. A lens module with integrated functionality, comprising:
a plurality of lens groups for receiving an image and providing a zooming capability, the lens groups comprising a compound zoom lens system;
an anamorphic lens to modify the image aspect ratio;
a focal plane array aligned with the lens groups for capturing the image through the lens groups and generating raw image data;
an Image Signal Processor (ISP) co-located with the focal plane array on a single integrated circuit for receiving and processing the raw image data and generating control signals, the control signals including a focus control signal and a zoom control signal, the ISP programmed for performing an anamorphic image processing algorithm to de-anamorphose the image;
drive electronics communicatively coupled to the ISP for receiving the control signals and generating lens motor drive signals;
one or more lens motor drives communicatively coupled to the drive electronics for receiving the lens motor drive signals, and coupled to the lens groups for moving the lens groups in accordance with the lens motor drive signals; and
a lens module chassis for supporting the lens groups, the focal plane array, the ISP, the drive electronics, and the one or more lens motor drives, the lens module chassis for enabling the lens module to be assembled into an imaging system as a single component.

24. The lens module as recited in claim 23, wherein at least one of the lens groups is a focus lens group, the ISP is for further generating focus control signals, and the one or more lens motor drives includes a focus lens motor drive.

25. The lens module as recited in claim 24, further including a focus sensor communicatively coupled to the ISP for assisting the ISP in generating focus control signals.

26. The lens module as recited in claim 23, wherein the ISP is configured for processing stabilization data and generating stabilization control signals, temperature data and generating focus control signals for temperature compensation, flash control signals for a flash driver, or shutter control signals for a shutter.

27. The lens module as recited in claim 23, further comprising:
one or more connectors to connect the lens module to a host device, the one or more connectors including one or more of an electrical interface for transferring data to and from the lens module, and a mechanical interface for accurately locating the lens module into the host device.

28. The lens module as recited in claim 27, wherein the mechanical interface is integrated with the electrical interface to form a single electro-mechanical connector.

29. A method for integrating lens module functionality, comprising:
- receiving an image through a compound zoom lens system;
- squeezing or expanding the image through an anamorphic lens;
- capturing the received image and generating raw image data;
- receiving and processing the raw image data and generating control signals, the control signals including a focus control signal and a zoom control signal;
- transfiguring the image format and aspect ratio through an anamorphic image processing algorithm;
- receiving the control signals and generating lens motor drive signals;
- receiving the lens motor drive signals and moving lens groups in the compound zoom lens system in accordance with the lens motor drive signals; and
- performing the preceding steps within a lens module chassis for enabling the lens module chassis to be assembled into an imaging system as a single component.

30. The method as recited in claim 29, further comprising performing the steps of (1) capturing the received image and generating raw image data and (2) receiving and processing the raw image data and generating control signals, the control signals including a focus control signal and a zoom control signal, within a single integrated circuit.

31. The method as recited in claim 30, further comprising processing stabilization data and generating stabilization control signals, processing temperature data and generating focus control signals for temperature compensation, processing flash control signals for a flash driver, or processing shutter control signals for a shutter within the single integrated circuit.

32. The method as recited in claim 29, further comprising:
- providing one or more of an electrical interface for transferring data to and from the lens module, and a mechanical interface for accurately locating the lens module into a host device.

33. The method as recited in claim 32, further comprising integrating the mechanical interface with the electrical interface to form a single electro-mechanical connector.

* * * * *